US008703998B2

(12) United States Patent
Peng et al.

(10) Patent No.: US 8,703,998 B2
(45) Date of Patent: Apr. 22, 2014

(54) FLUOROSULFONATES

(75) Inventors: Sheng Peng, Hockessin, DE (US); Phan Linh Tang, West Chester, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/163,978

(22) Filed: Jun. 20, 2011

(65) Prior Publication Data

US 2011/0245135 A1 Oct. 6, 2011

Related U.S. Application Data

(62) Division of application No. 12/270,148, filed on Nov. 13, 2008.

(51) Int. Cl.
*C08F 14/18* (2006.01)

(52) U.S. Cl.
USPC .......................... 562/113; 524/165; 524/805

(58) Field of Classification Search
USPC .................................. 524/805, 165; 562/113
See application file for complete search history.

(56) References Cited

U.S. PATENT DOCUMENTS

| 3,282,875 | A | 11/1966 | Connolly et al. |
| 4,180,639 | A | 12/1979 | Caporiccio et al. |
| 4,358,545 | A | 11/1982 | Ezzell et al. |
| 4,380,618 | A | 4/1983 | Khan et al. |
| 4,552,631 | A | 11/1985 | Bissot et al. |
| 4,784,809 | A | 11/1988 | Goldbaum et al. |
| 4,940,525 | A | 7/1990 | Ezzell et al. |
| 5,536,754 | A | 7/1996 | Feiring |
| 5,611,850 | A | 3/1997 | Nishi et al. |
| 5,616,273 | A | 4/1997 | Clark et al. |
| 5,637,748 | A | 6/1997 | Hung et al. |
| 5,712,240 | A | 1/1998 | Tyerech et al. |
| 5,763,552 | A | 6/1998 | Feiring et al. |
| 6,177,196 | B1 | 1/2001 | Brothers et al. |
| 6,268,532 | B1 | 7/2001 | DesMarteau et al. |
| 6,300,445 | B1 | 10/2001 | Hung et al. |
| 6,395,848 | B1 | 5/2002 | Morgan et al. |
| 6,462,228 | B1 | 10/2002 | Dams |
| 6,534,470 | B1 | 3/2003 | Durbut et al. |
| 6,555,639 | B2 | 4/2003 | Apostolo et al. |
| 6,613,730 | B1 | 9/2003 | Durbut et al. |
| 6,767,977 | B2 | 7/2004 | Arcella et al. |
| 6,869,997 | B2 | 3/2005 | Antoun et al. |
| 7,122,610 | B2 | 10/2006 | Wille et al. |
| 2006/0166007 | A1 | 7/2006 | Kent et al. |
| 2007/0100062 | A1* | 5/2007 | Lyons et al. ............. 524/544 |
| 2007/0117914 | A1 | 5/2007 | Hintzer et al. |

FOREIGN PATENT DOCUMENTS

| CN | 1639208 | 7/2005 |
| FR | 2871460 | 12/2005 |
| FR | 2871461 | 12/2005 |
| FR | 2871469 | 12/2005 |
| JP | 52023023 | 5/1977 |
| JP | 55145798 | 1/1980 |
| JP | 10036501 | 2/1988 |
| JP | 07062386 | 3/1995 |
| JP | 2005105045 | 4/2005 |
| JP | 06009542 | 5/2005 |
| JP | 2003292989 | 5/2005 |
| RU | 2069673 | 5/1995 |
| WO | 95/11877 | 5/1995 |
| WO | 2005/033150 | 4/2005 |
| WO | 2005/121290 | 12/2005 |
| WO | WO 2005121290 A1 * | 12/2005 |
| WO | 2007050933 A1 | 5/2007 |
| WO | 2009137736 A1 | 11/2009 |

OTHER PUBLICATIONS

Balague et al., Synthesis of fluorinated telomers. Part 1. Telomerization of vinylidene fluoride with perfluoroalkyl iodides, Journal of Fluoride Chemistry (1995), 70(2), 215-223, Elsevier Science S.A.
Torcheux et al., Effect of a special additive on the performance of standy valve-regulated lead acid batteries, Journal of Power Sources (1999), 78(1-2), 147-155, Elsevier Science S.A.
Miyatake et al., Synthesis and properties of novel sulfonated arylene ether/fluorinated alkane copolymers (2001), 34, 2065-2071, American Chemical Society.

* cited by examiner

*Primary Examiner* — Kelechi Egwim

(57) ABSTRACT

A process comprising polymerizing in an aqueous medium at least one fluorinated olefin monomer other than vinylidene fluoride in the presence of a compound of formula (1):

$$R_f(CH_2CF_2)_m-(CH_2)_nSO_3M \quad (1)$$

wherein
Rf is a $C_1$ to $C_4$ linear or branched perfluoroalkyl group,
m is an integer of from 1 to 6,
n is from 0 to 4,
M is H, $NH_4$, Li, Na or K, and a method of altering the surface behavior of a liquid comprising adding to the liquid the composition of a compound of formula (1).

5 Claims, No Drawings

FLUOROSULFONATES

FIELD OF THE INVENTION

This invention relates to a process for the dispersion polymerization of fluorinated monomer in an aqueous polymerization medium in the presence of a fluorosulfonate surfactant.

BACKGROUND OF THE INVENTION

Dispersion processes for polymerizing fluoro olefin monomers in aqueous media are well known. Such processes employ a surfactant to provide stability to the aqueous dispersion of particles of resulting fluoropolymer. Different surfactants are chosen for use in dispersion polymerization because of their influence on reaction rate, dispersed fluoropolymer particle size, dispersion stability, color and the like.

Kappler and Lina disclose a process for the manufacture of fluoropolymer by polymerization of an aqueous dispersion of vinylidene fluoride in WO2005/121290, said dispersion containing a fluorosurfactant chosen from one or more of the following products: $R_f(CH_2CF_2)m_{-1}-(CH_2)_nCO_2M$ [1] $R_f(CH_2CF_2)mSO_2M$ [2] $R_f(CH_2CF_2)m(CH_2)_nSO_2M$ [3], wherein $R_f$ is a linear or branched perfluoroalkyl group comprising form 1 to 5 carbon atoms, m is an integer from 2 to 6, n is an integer from 0 to 2, and M is a hydrogen atom or an alkali metal atom or an ammonium group or an ammonium group comprising at least one lower alkyl substituent.

Polymerization of other monomers, such as tetrafluoroethylene with hexafluoropropylene or perfluoro(methyl vinyl ether) are very sensitive to chain transfer during the polymerization. The vinylidene fluoride, as taught by WO 2005/121290 is less sensitive to such chain transfer. It is desirable to have a polymerization process that can be employed with these more sensitive monomers using a surfactant containing low levels of fluorine.

It is also known that the presence of a fluorocarbon "tail" in the hydrophobic segment of surfactants provides extremely low surface energy. Such fluorinated surfactants are much more surface active than their hydrocarbon counterparts. For surfactants having fluorochemical chains, longer perfluoroalkyl chains contain a higher percentage of fluorine at a given concentration and typically provide better performance. However, the fluorinated materials derived from longer perfluoroalkyl chains are more expensive. Therefore, it is desirable to reduce the fluorine content with delivery of the same or higher performance.

The present invention provides a polymerization process using a surfactant containing low levels of fluorine which is effective with monomers sensitive to chain transfer.

SUMMARY OF THE INVENTION

The present invention comprises a process comprising polymerizing in an aqueous medium at least one fluorinated olefin monomer other than vinylidene fluoride in the presence of a compound of formula (1):

$$R_f(CH_2CF_2)_m-(CH_2)_nSO_3M \quad (1)$$

wherein
Rf is a $C_1$ to $C_4$ linear or branched perfluoroalkyl group,
m is an integer of from 1 to 6,
n is from 0 to 4,
M is H, $NH_4$, Li, Na or K.

The present invention further comprises a method of altering the surface behavior of a liquid comprising adding to the liquid the composition of a compound of formula (1) as defined above.

DETAILED DESCRIPTION OF THE INVENTION

A process in accordance with the invention comprises polymerizing at least one fluorinated olefin monomer other than vinylidene fluoride in an aqueous medium containing initiator and polymerization agent to form an aqueous dispersion of particles of fluoropolymer, the polymerization agent comprising a compound of formula (1):

$$R_f(CH_2CF_2)_m-(CH_2)_nSO_3M \quad (1)$$

wherein
Rf is a $C_1$ to $C_4$ linear or branched perfluoroalkyl group,
m is an integer of from 1 to 6,
n is from 0 to 4,
M is H, $NH_4$, Li, Na or K.

One of the advantages of using the fluorosulfonate surfactants of formula (1) in a dispersion polymerization processes is to achieve more stable dispersions and increased polymerization rate using reduced fluorinated surfactant concentration and reduced fluorine content and to increase the "fluorine efficiency". By the term "fluorine efficiency" as used herein is meant the ability to use a minimum amount of fluorosurfactants and use lower level of fluorine to obtain the desired dispersion of polymers. It has been discovered in this invention, when m is 1, the surfactant of formula (1) is more stable in aqueous medium than the corresponding compounds when m is 2 or above. While not wishing to be bound by theory, when m is 1, M is less acidic hydrogen than when m is 2 or above. Another advantage of the process of the present invention is that monomers sensitive to chain transfer can be polymerized to obtain a stable fluoropolymer.

The fluorosulfonate surfactants of formula (1) used in the process of the present invention are prepared according to the following reaction scheme 1.

Scheme 1

(I)

(II)

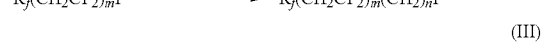

(III)

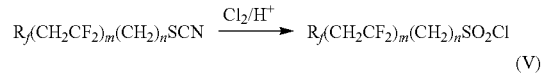

(IV)

(V)

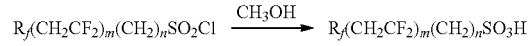

The telomerization of vinylidene fluoride (VDF) with linear or branched perfluoroalkyl iodides is well known, for example see Balague, et al, "Synthesis of fluorinated telomers, Part 1, Telomerization of vinyldiene fluoride with perfluoroalkyl iodides", J. Fluor. Chem. (1995), 70(2), 215-23. The specific telomer iodides are isolated by fractional distillation. The resulting telomer iodide $R_f(CH_2CF_2)_mI$ are treated with ethylene by procedures described in U.S. Pat. No. 3,979, 469, to provide the telomere ethylene iodides $R_f(CH_2CF_2)_m(CH_2)_nI$ (II). $R_f(CH_2CF_2)_m(CH_2)_nI$ is reacted with potassium thiocynate with trioctylmethylammonium chloride in water to provide the telomere ethylene thiocynate $R_f(CH_2CF_2)_m(CH_2)_nSCN$ (III). Chlorine gas then is fed into the mixture of the telomere ethylene thiocynate and acetic acid. The product obtained is $Rf(CH_2CF_2)_m(CH_2)_nSO_2Cl$ (IV), which is then treated with methanol to generate the product is $R_f(CH_2CF_2)_m(CH_2)_nSO_3H$ (V).

In accordance with the invention, the surfactant of formula (1) is preferably dispersed adequately in aqueous medium to function effectively as a polymerization agent. "Dispersed" as used in this application refers to either dissolved in cases in which the surfactant is soluble in the aqueous medium, or dispersed in cases in which the surfactant is not fully soluble and is present in very small particles, for example about 1 nm to about 1 micrometer particle size distribution, in the aqueous medium. Similarly, "dispersing" as used in this application refers to either dissolving or dispersing the surfactant so that it is dispersed as defined above. Preferably, the surfactant is dispersed sufficiently so that the polymerization medium containing the surfactant appears water clear or nearly water clear.

Preferably, the total amount of polymerization agent used in a preferred process in accordance with the invention is from about 5 to about 10,000 micrograms/g based on the weight of water in the aqueous medium, more preferably from about 5 to about 3000 micrograms/g based on the weight of water in the aqueous medium. Even more preferably, the total amount of polymerization agent used is from about 0.01% by weight to about 10% by weight based on the weight of water in the aqueous medium, still more preferably from about 0.05% to about 3% by weight, more preferably from about 0.05% to about 3% based on the weight of water in the aqueous medium.

At least a portion of the polymerization agent is preferably added to the polymerization prior to the beginning of the polymerization. If added subsequently, a variety of modes of addition for the polymerization agent can be used; including continuously throughout the polymerization or in doses or intervals at predetermined times during the polymerization. In accordance with one embodiment of the invention, substantially all of the polymerization agent is added to the aqueous medium prior to the start of polymerization, preferably prior to initiator addition.

In accordance with a preferred embodiment of the invention the polymerization agent used in the practice of this invention is preferably substantially free of perfluoropolyether oil (i.e., perfluoropolyethers having neutral, nonionic, preferably fluorine or hydrogen, end groups). Substantially free of perfluoropolyether oils means that aqueous polymerization medium contains no more than about 10 micrograms/g of such oils based on water. Thus, the fluoropolymer dispersion preferably produced has high purity and preferably is substantially free of perfluoropolyether oils. Moreover, in a preferred process, the polymerization medium is substantially free of fluoropolymer seed at the start of polymerization (kick-off). In this preferred form of the invention, fluoropolymer seed, i.e., separately polymerized small fluoropolymer particles in dispersion form, is not added prior to the start of polymerization.

It has been found that the polymerization agent of formula (1) used in the present invention can produce fluoropolymers and provide low levels of undispersed polymer (referred to as coagulum) substantially equivalent to those made using the typical perfluoroalkane carboxylic acid surfactants and at high dispersion solids concentrations.

The polymerization process can be carried out as a batch, semi-batch or continuous process in a pressurized reactor. In a batch process, all of the ingredients are added to the polymerization reactor at the beginning of the run and are allowed to react to completion before discharging the vessel. In a semibatch process, one or more ingredients (such as monomers, initiator, surfactant, etc.) are added to the vessel over the course of the reaction following the initial precharging of the reactor. At the completion of a semibatch process, the contents are discharged from the vessel. In a continuous process, the reactor is precharged with a predetermined composition and then monomers, surfactants, initiators and water are continuously fed into the reactor while an equivalent volume of reaction goods are continuously removed from the reactor, resulting in a controlled volume of reacting goods inside the reactor. Following this start-up procedure, a continuous process can run indefinitely as long as feed material continues to be metered into the reactor and product goods are removed. When shut-down is desired, the feeds to the reactor can be stopped and the reactor discharged.

In one preferred embodiment of the invention, the polymerization process is carried out as a batch process in a pressurized reactor. Suitable vertical or horizontal reactors for carrying out the process of the invention are equipped with stirrers for the aqueous medium. The reactor provides sufficient contact of gas phase monomers such as tetrafluoroethylene (TFE) for desirable reaction rates and uniform incorporation of comonomers if employed. The reactor preferably includes a cooling jacket surrounding the reactor so that the reaction temperature is conveniently controlled by circulation of a controlled temperature heat exchange medium.

In a typical process, the reactor is first charged with deionized and deaerated water of the polymerization medium, and the acid or salt surfactant of formula (1) is dispersed in the medium. The dispersing of the surfactant is as discussed above. At least a portion of the polymerization agent (surfactant) is preferably added to the polymerization prior to the beginning of the polymerization. If added subsequently, a variety of modes of addition for the polymerization agent can be used including continuously throughout the polymerization, or in doses or intervals at predetermined times during the polymerization.

For polytetrafluoroethylene (PTFE) homopolymer and modified polytetrafluoroethylene (PTFE), paraffin wax as stabilizer is often added. A suitable procedure for polytetrafluoroethylene (PTFE) homopolymer and modified polytetrafluoroethylene (PTFE) includes first pressurizing the reactor with tetrafluoroethylene (TFE). If used, the comonomer such as hexafluoropropylene (HFP) or perfluoro(alkyl vinyl ether) (PAVE) is then added. A free-radical initiator solution such as ammonium persulfate solution is then added. For polytetrafluoroethylene (PTFE) homopolymer and modified polytetrafluoroethylene (PTFE), a second initiator which is a source of succinic acid such as disuccinyl peroxide may be present in the initiator solution to reduce coagulum. Alternatively, a redox initiator system such as potassium permanganate/oxalic acid is used. The temperature is increased and, once polymerization begins, additional tetrafluoroethylene (TFE) is added to maintain the pressure. The beginning of polymerization is referred to as kick-off and is defined as the point at which gaseous monomer feed pressure is observed to drop substantially, for example, about 10 psi (about 70 kPa). Comonomer and/or chain transfer agent can also be added as the polymerization proceeds. For some polymerizations, additional monomers, initiator and or polymerization agent may be added during the polymerization.

After batch completion (typically several hours) when the desired amount of polymer or solids content has been achieved, the feeds are stopped, the reactor is vented and purged with nitrogen, and the raw dispersion in the vessel is transferred to a cooling vessel.

The solids content of the dispersion upon completion of polymerization can be varied depending upon the intended use for the dispersion. For example, the process of the invention can be employed to produce a "seed" dispersion with low solids content, e.g., less than 10% by weight, which is employed as "seed" for a subsequent polymerization process to a higher solids level. In other processes, the solids content of fluoropolymer dispersion produced by the process of the invention is preferably at least about 10% by weight. More preferably, the fluoropolymer solids content is at least about 20% by weight. A preferred range for fluoropolymer solids content produced by the process is about 14% by weight to about 65% by weight, even more preferably about 20% by weight to about 55% by weight, most preferably, about 35% by weight to about 55% by weight.

In a preferred process of the invention, polymerizing produces less that about 10% by weight, more preferably less than 3% by weight, even more preferably less than 1% by weight, most preferably less that about 0.5% by weight undispersed fluoropolymer (coagulum) based on the total weight of fluoropolymer produced.

The as-polymerized dispersion can be stabilized with anionic, cationic, or nonionic surfactant for certain uses. Typically however, the as-polymerized dispersion is transferred to a dispersion concentration operation which produces concentrated dispersions stabilized typically with nonionic surfactants by known methods. Solids contents of concentrated dispersion are typically about 35 to about 70% by weight. Certain grades of polytetrafluoroethylene (PTFE) dispersion are made for the production of fine powder. For this use, the dispersion is coagulated, the aqueous medium is removed and the polytetrafluoroethylene (PTFE) is dried to produce fine powder.

The dispersion polymerization of melt-processible copolymers is similar except that comonomer in significant quantity is added to the batch initially and/or introduced during polymerization. Chain transfer agents are typically used in significant amounts to decrease molecular weight to increase melt flow rate. The same dispersion concentration operation can be used to produce stabilized concentrated dispersions. Alternatively, for melt-processible fluoropolymers used as molding resin, the dispersion is coagulated and the aqueous medium is removed. The fluoropolymer is dried, then processed into a convenient form such as flake, chip or pellet for use in subsequent melt-processing operations.

The process of the invention can also be carried out as a semi-batch or as a continuous process in a pressurized reactor. These processes are especially suitable for the manufacture of fluorocarbon elastomers. In the semi-batch emulsion polymerization process of this invention, a gaseous monomer mixture of a desired composition (initial monomer charge) is introduced into a reactor which contains an aqueous medium precharge. Other ingredients, such as initiators, chain transfer agents, buffers, bases, and surfactants can be added with the water in the precharge, and also during the polymerization reaction. Additional monomers at concentrations appropriate to the final polymer composition desired are added during the polymerization reaction at a rate needed to maintain system pressure. Polymerization times in the range of from about 2 to about 30 hours are typically employed in the semi-batch polymerization process. In a continuous process, the reactor is completely filled with aqueous medium so that there is no vapor space. Gaseous monomers and solutions of other ingredients such as water-soluble monomers, chain transfer agents, buffer, bases, polymerization initiator, surfactant, etc., are fed to the reactor in separate streams at a constant rate. Feed rates are controlled so that the average polymer residence time in the reactor is generally between 0.2 to about 4 hours, depending on monomer reactivity. For both types of processes, the polymerization temperature is maintained in the range of from about 25° to about 130° C., preferably in the range of from about 50° C. to about 100° C. for semi-batch operation, and from about 70° C. to about 120° C. for continuous. The polymerization pressure is controlled in the range of from about 0.5 to about 10 MPa, preferably from about 1 to about 6.2 MPa. The amount of fluoropolymer formed is approximately equal to the amount of incremental feed charged, and is in the range of from about 10 to about 30 parts by weight of fluoropolymer per 100 parts by weight of aqueous emulsion, preferably in the range of from about 20 to about 30 parts by weight of the fluoropolymer.

Polymerization in accordance with the invention employs free radical initiators capable of generating radicals under the conditions of polymerization. As is well known in the art, initiators for use in accordance with the invention are selected based on the type of fluoropolymer and the desired properties to be obtained, e.g., end group type, molecular weight, etc. For some fluoropolymers such as melt-processible tetrafluoroethylene (TFE) copolymers, water-soluble salts of inorganic peracids are employed which produce anionic end groups in the polymer. Preferred initiators of this type have a relatively long half-life, preferably persulfate salts, e.g., ammonium persulfate or potassium persulfate. To shorten the half-life of persulfate initiators, reducing agents such as ammonium bisulfite or sodium metabisulfite, with or without metal catalyst salts such as Fe, can be used. Preferred persulfate initiators are substantially free of metal ions and most preferably are ammonium salts.

For the production of polytetrafluoroethylene (PTFE) or modified polytetrafluoroethylene (PTFE) dispersions for dispersion end uses, small amounts of short chain dicarboxylic acids such as succinic acid or initiators that produce succinic acid such as disuccinic acid peroxide (DSP) are preferably also added in addition to the relatively long half-life initiators such as persulfate salts. Such short chain dicarboxylic acids are typically beneficial in reducing undispersed polymer (coagulum). For the production of polytetrafluoroethylene (PTFE) dispersion for the manufacture of fine powder, a redox initiator system such as potassium permanganate/oxalic acid is often used.

The initiator is added to the aqueous polymerization medium in an amount sufficient to initiate and maintain the polymerization reaction at a desired reaction rate. At least a portion of the initiator is preferably added at the beginning of the polymerization. A variety of modes of addition may be used including continuously throughout the polymerization, or in doses or intervals at predetermined times during the polymerization. A particularly preferred mode of operation is for initiator to be precharged to the reactor and additional initiator to be continuously fed into the reactor as the polymerization proceeds. Preferably, total amounts of ammonium persulfate and/or potassium persulfate employed during the course of polymerization are about 25 micrograms/g to about 250 micrograms/g based on the weight of the aqueous medium. Other types of initiators, for example, potassium permanganate/oxalic acid initiators, can be employed in amounts and in accordance with procedures as known in the art.

Chain-transfer agents can be used in a process in accordance with the invention for the polymerization of some types of polymers, e.g., for melt-processible tetrafluoroethylene (TFE) copolymers, to decrease molecular weight for the purposes of controlling melt viscosity. Chain transfer agents useful for this purpose are well-known for use in the polymerization of fluorinated monomers. Preferred chain transfer agents include hydrogen, aliphatic hydrocarbons, halocarbons, hydrohalocarbons or alcohols having 1 to 20 carbon atoms, more preferably 1 to 8 carbon atoms. Representative examples of such chain transfer agents are alkanes such as ethane, chloroform, 1,4-diiodoperfluorobutane and methanol.

The amount of a chain transfer agent and the mode of addition depend on the activity of the particular chain transfer agent and on the desired molecular weight of the polymer product. A variety of modes of addition can be used including a single addition before the start of polymerization, continuously throughout the polymerization, or in doses or intervals at predetermined times during the polymerization. The amount of chain train transfer agent supplied to the polymerization reactor is preferably about 0.005 to about 5% by weight, more preferably from about 0.01 to about 2% by weight based upon the weight of the resulting fluoropolymer.

In accordance with the invention, the present invention provides a process as one of the embodiments of the invention comprising polymerizing olefin fluoromonomers in aqueous medium containing the surfactants of formula (1). The surfactants of formula (1) are used in the process of the aqueous dispersion polymerization of olefin fluoromonomers. Water-soluble initiator is generally used in amount of from about 2 to about 500 micrograms/g based on the weight of water present. Examples of such initiators include ammonium persulfate, potassium persulfate, permanganate/oxalic acid, and disuccinic acid peroxide. The polymerization can be carried out by charging the polymerization reactor with water, surfactant, olefin fluoromonomers, and optionally chain transfer agent, agitating the contents of the reactor, and heat the reactor to the desired polymerization temperature, e.g., from about 25° to about 110° C.

The amount of the surfactant of formula (1) used in the process of the invention mentioned above is within known ranges, for example, from about 0.01% by weight to about 10% by weight, preferably from about 0.05 to about 3% by weight, more preferably from about 0.05 to about 1.0% by weight, based on the water used in the polymerization. The concentration of surfactant that can be employed in the polymerization process of the present invention can be above or below the critical micelle concentration (c.m.c.) of the surfactant.

The process of the present invention provides a dispersion of fluoropolymers as the result of the aqueous dispersion polymerization of olefin fluoromonomers described above.

Fluoropolymer dispersions formed by this invention are comprised of particles of fluoropolymer made from at least one fluorinated monomer, i.e., wherein at least one of the monomers contains fluorine, preferably an olefinic monomer with at least one fluorine or a perfluoroalkyl group attached to a doubly-bonded carbon. The fluorinated monomer used in the process of this invention is preferably independently selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether). A preferred perfluoroalkyl ethylene monomer is perfluorobutyl ethylene (PFBE). Preferred fluorovinyl ethers include perfluoro(alkyl vinyl ether) monomers (PAVE) such as perfluoro(propyl vinyl ether) (PPVE), perfluoro(ethyl vinyl ether) (PEVE), and perfluoro(methyl vinyl ether) (PMVE). Non-fluorinated olefinic comonomers such as ethylene and propylene can be copolymerized with fluorinated monomers.

Fluorovinyl ethers also include those useful for introducing functionality into fluoropolymers. These include $CF_2=CF-(O-CF_2CFR_f)_a-O-CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875 ($CF_2=CF-O-CF_2CF(CF_3)-O-CF_2CF_2SO_2F$, perfluoro(3,6-dioxa-4-methyl-7-octenesulfonyl fluoride)), and in U.S. Pat. Nos. 4,358,545 and 4,940,525 ($CF_2=CF-O-CF_2CF_2SO_2F$). Another example is $CF_2=CF-O-CF_2-CF(CF_3)-O-CF_2CF_2CO_2CH_3$, methyl ester of perfluoro (4,7-dioxa-5-methyl-8-nonenecarboxylic acid), disclosed in U.S. Pat. No. 4,552,631. Similar fluorovinyl ethers with functionality of nitrile, cyanate, carbamate, and phosphate are disclosed in U.S. Pat. Nos. 5,637,748; 6,300,445; and 6,177,196.

The invention is especially useful when producing dispersions of polytetrafluoroethylene (PTFE) including modified polytetrafluoroethylene (modified PTFE). PTFE and modified PTFE typically have a melt creep viscosity of at least about $1 \times 10^8$ Pa·s and, with such high melt viscosity, the polymer does not flow significantly in the molten state and therefore is not a melt-processible polymer.

Polytetrafluoroethylene (PTFE) refers to the polymerized tetrafluoroethylene by itself without any significant comonomer present. Modified PTFE refers to copolymers of tetrafluoroethylene (TFE) with such small concentrations of comonomer that the melting point of the resultant polymer is not substantially reduced below that of PTFE. The concentration of such comonomer is preferably less than 1% by weight, more preferably less than 0.5% by weight. A minimum amount of at least about 0.05% by weight is preferably used to have significant effect. The modified PTFE contains a small amount of comonomer modifier which improves film forming capability during baking (fusing), such as perfluoroolefin, notably hexafluoropropylene (HFP) or perfluoro (alkyl vinyl ether) (PAVE), where the alkyl group contains 1 to 5 carbon atoms, with perfluoro(ethyl vinyl ether) (PEVE) and perfluoro(propyl vinyl ether) (PPVE) being preferred. Chlorotrifluoroethylene (CTFE), perfluorobutyl ethylene (PFBE), or other monomer that introduces bulky side groups into the molecule are also included.

The invention is especially useful when producing dispersions of melt-processible fluoropolymers. By melt-processible, it is meant that the polymer can be processed in the molten state (i.e., fabricated from the melt into shaped articles such as films, fibers, and tubes etc. that exhibit sufficient strength and toughness to be useful for their intended purpose) using conventional processing equipment such as extruders and injection molding machines. Examples of such melt-processible fluoropolymers include homopolymers such as polychlorotrifluoroethylene or copolymers of tetrafluoroethylene (TFE) and at least one fluorinated copolymerizable monomer (comonomer) present in the polymer usually in sufficient amount to reduce the melting point of the copolymer substantially below that of tetrafluoroethylene (TFE) homopolymer, polytetrafluoroethylene (PTFE), e.g., to a melting temperature no greater than 315° C.

A melt-processible tetrafluoroethylene (TFE) copolymer typically incorporates an amount of comonomer into the copolymer in order to provide a copolymer which has a melt flow rate (MFR) of about 1-100 g/10 min as measured according to ASTM D-1238 at the temperature which is standard for the specific copolymer. Preferably, the melt viscosity is at least about $10^2$ Pa·s, more preferably, will range from about $10^2$ Pa·s to about $10^6$ Pa·s, most preferably about $10^3$ to about $10^5$ Pa·s measured at 372° C. by the method of ASTM D-1238 modified as described in U.S. Pat. No. 4,380,618. Additional melt-processible fluoropolymers are the copolymers of ethylene (E) or propylene (P) with tetrafluoroethylene (TFE) or chlorotrifluoroethylene (CTFE), notably ethylene tetrafluoroethylene (ETFE), ethylene chlorotrifluoroethylene (ECTFE) and propylene chlorotrifluoroethylene (PCTFE). A preferred melt-processible copolymer for use in the practice of the present invention comprises at least about 40-98 mol % tetrafluoroethylene units and about 2-60 mol % of at least one other monomer. Preferred comonomers with tetrafluoroethylene (TFE) are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers.

Preferred tetrafluoroethylene (TFE) copolymers include 1) tetrafluoroethylene/hexafluoropropylene (TFE/HFP) copolymer; 2) tetrafluoroethylene/perfluoro(alkyl vinyl ether) (TFE/PAVE) copolymer; 3) tetrafluoroethylene/hexafluoro propylene/perfluoro (alkyl vinyl ether) (TFE/HFP/PAVE) copolymer wherein the perfluoro (alkyl vinyl ether) is perfluoro(ethyl vinyl ether) or perfluoro(propyl vinyl ether); 4) melt processible tetrafluoroethylene/perfluoro(methyl vinyl ether)/perfluoro (alkyl vinyl ether) (TFE/PMVE/PAVE) copolymer wherein the alkyl group of perfluoro (alkyl vinyl ether) (PAVE) has at least two carbon atoms); and 5) tetrafluoroethylene/hexafluoropropylene/vinylidene fluoride copolymer (TFE/HFP/VF2)).

Further useful polymers are film forming polymers of polyvinylidene fluoride (PVDF) and copolymers of vinylidene fluoride as well as polyvinyl fluoride (PVF) and copolymers of vinyl fluoride.

The invention is also useful when producing dispersions of fluorocarbon elastomers. These elastomers typically have a glass transition temperature below 25° C. and exhibit little or no crystallinity at room temperature. Fluorocarbon elastomer copolymers made by the process of this invention typically contain 25 to 70% by weight, based on total weight of the fluorocarbon elastomer, of copolymerized units of a first fluorinated monomer which may be vinylidene fluoride (VF2) or tetrafluoroethylene (TFE). The remaining units in the fluorocarbon elastomers are comprised of one or more additional copolymerized monomers, different from said first monomer, selected from the group consisting of fluorinated monomers, hydrocarbon olefins and mixtures thereof. Fluorocarbon elastomers prepared by the process of the present invention may also, optionally, comprise units of one or more cure site monomers. When present, copolymerized cure site monomers are typically at a level of 0.05 to 7% by weight, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro(2-phenoxypropyl vinyl ether); and iv) non-conjugated dienes.

Preferred tetrafluoroethylene (TFE) based fluorocarbon elastomer copolymers include tetrafluoroethylene/perfluoro (methyl vinyl ether) (TFE/PMVE); tetrafluoroethylene/perfluoro(methyl vinyl ether)/ethylene (TFE/PMVE/E); tetrafluoroethylene/propylene (TFE/P); and tetrafluoroethylene/propylene/vinylidene fluoride (TFE/P/VF2). Preferred vinylidene fluoride (VF2) based fluorocarbon elastomer copolymers include vinylidene fluoride/hexafluoropropylene (VF2/HFP); vinylidene fluoride/hexafluoropropylene/tetrafluoroethylene (VF2/HFP/TFE); and vinylidene fluoride/perfluoro(methyl vinyl ether)/tetrafluoroethylene (VF2/PMVE/TFE). Any of these elastomer copolymers may further comprise units of cure site monomer.

The present invention further provides a method of lowering surface tension of a medium, typically a liquid, comprising adding to the medium a compound of formula (1) as described above. Normal surface tension of deionized water is 72 dyne/cm. The above compound of formula (1) is a fluorinated sulfonate surfactant which lowers surface tension at a specified rate. Generally better performance is obtained at higher concentrations of the surfactant in water. Such surface tension values in a medium, typically a liquid, are less than about 25 milli-newtons per meter, preferably less than about 20 milli-newtons per meter, at a concentration of the surfactant in the medium of less than about 1% by weight.

The above compound of formula (1) comprises at least one hydrophobic part which contains the $R_f$ fluoroalkyl group. As a result, the compound is able to lower surface tension at very low concentration. Having the hydrophobic part as $R_f$ fluoroalkyl group, the compound represented by formula (1) of the present invention exhibits both hydrophobic and oleophobic properties. The compound represented by formula (1) also comprises a hydrophilic part which contains sulfonic acid, or a salt of the acid. The hydrophilic part provides effective solubility in water media, and therefore the compounds represented by formula (1) of the present invention exhibit surfactant properties. The compounds represented by formula (1) are fluorinated sulfonate surfactant.

Therefore, the compounds of formula (1) can be used as antistat in films. The compound is distinguished by its exceptional chemical stability in corrosive medium, in particular, very acidic solutions. The compound is also a very low foaming agent. Such surfactant imparts additional properties. The compound is useful to a formulation based on aggressive (highly acidic, oxidizing, or reducing) media, such as in chrome plating baths. For example, such fluorosulfonate surfactant used in the present invention can be used as a special additive to improve the performance of standby valve-regulated lead acid batteries. As described by Torcheux in "Effect of a special additive on the performance of standby valve-regulated lead acid batteries" Journal of Power Sources Vol. 78, Issues 1-2, Page 147-155 (1999), a polyfluoroalkyl sulfonic acid is used as electrolyte additive to improve the performance of standby VRLA batteries. The surfactant used in the present invention which has a high stability in sulfuric acid even at high potentials can effectively decrease the electrochemical activity at the electrodes and to limit corrosion and drying out; therefore significantly improve the performance of the batteries.

The above compound of formula (1) is suitable for providing to the medium to which the surfactant is added improved surface effects. The improved surface effects include blocking resistance, enhanced hiding power (leveling), spreading, wettability, penetrability, foam inhibition and dispersibility. The improved surface effects by the compounds of the present invention are suitable for many industrial applications including aqueous coatings such as inks, paints, varnishes, and the like. For example, the fluorosulfonate surfactant of formula (1) provides wetting of the surface of the components to be treated and promotes the formation of a layer of foam on the surface of the chrome plating bath, preventing dangerous chromic acid fume generation. In metal treatment, the fluorosulfonate surfactant of formula (1) can be used for cleaning, decaling and picking In particular the surfactants of formula (1) are useful to provide exceptional chemical stability in aggressive or corrosive media, in particular very acidic solutions. Thus the surfactants of formula (1) impart properties that prove useful in formulations based on highly acidic, oxidizing, or reducing media. This stability is provided while using shorter perfluoroalkyl groups, thus providing fluorine efficiency.

MATERIALS AND TEST METHODS

Materials

Tetrafluoroethylene was obtained from E.I. du Pont de Nemours and Company, Wilmington, Del. Olefins were commercial grade materials and were used as obtained from E.I. du Pont de Nemours and Company, Wilmington, Del. The vinylidene fluoride was obtained from Solvay Solexus, Inc., West Deptford, N.J. Other reagents were commercially available, for example, from Aldrich Chemical Co., Milwaukee, Wis. The initiator, ammonium persulfate, was purchased from Sigma-Aldrich Corporation, St. Louis, Mo.

Compound 1

Ethylene (25 g, 0.53 mol) was introduced to an autoclave charged with $C_4F_9CH_2CF_2I$ (217 g, 0.87 mol) and d-(+)-limonene (1 g), and then the reactor was heated at 240° C. for 12 hours. Product $C_4F_7CH_2CF_2CH_2CH_2I$ was obtained via vacuum distillation at about 81 to 91° C. at 19 to 24 mmHg (2533 to 3200 Pa) in 62% yield. $C_4F_7CH_2CF_2CH_2CH_2I$ (140 g, 0.33 mol) was added to the mixture of ethanol (165 mL) and water (165 mL). Sodium sulfite (83 g, 0.66 mol) was added, followed by 8 g copper. The reaction mixture was stirred vigorously under reflux for a week. 500 mL water was added and filtered at 75° C. The filtrate was cooled and the product $C_4F_7CH_2CF_2CH_2CH_2SO_3Na$ was collected by filtration as white solid (112 g, 84%).

$^1$H NMR (CDCl$_3$, 400 MHz) δ 3.22~3.05 (4H, m), 2.5~92.46 (2H, m)

$^{19}$F NMR (CDCl$_3$, 373 Hz) δ −81.44 (3F, t-t, J$_1$=9.7 Hz, J$_2$=4.1 Hz), −95.39 (2F, t-t, J$_1$=30.0 Hz, J$_2$=15.0 Hz), −112.90~−113.13 (2F, m), −124.98~−125.00 (2F, m), −126.16~−126.27 (2F, m).

Compound 2

Ethylene (25 g, 0.53 mol) was introduced to an autoclave charged with $C_4F_9CH_2CF_2I$ (217 g, 0.87 mol) and d-(+)-limonene (1 g), and then the reactor was heated at 240° C. for 12 hours. Product $C_4F_7CH_2CF_2CH_2CH_2I$ was obtained via vacuum distillation at about 81 to 91° C. at 19 to 24 mmHg (2533 to 3200 Pa) in 62% yield. Potassium thiocynate (21.34 g, 0.22 mol) was added to the mixture of $C_4F_7CH_2CF_2CH_2CH_2I$ (50 g, 0.11 mol) and trioctylmethylammonium chloride (0.2222 g) in 50 g of water. The reaction was heated overnight at 90° C. After phase separation, the product $C_4F_7CH_2CF_2CH_2CH_2SCN$ was distilled as a colorless liquid (38 g, 95%). b.p. 84~85° C./0.7 torr $^1$H NMR (CDCl$_3$, 400 MHz) δ 3.09 (2H, t, J=8.0 Hz), 2.78~2.62 (2H, m), 2.50 (2H, t-t, J1=16.7 Hz, J2=6.0 Hz)

$^{19}$F NMR (CDCl$_3$, 373 Hz) δ −81.49 (3F, t-t, J1=10 Hz, J2=3 Hz), −92.76~93.91 (2F, m), −113.09 (2F, m), −124.689~124.78 (2F, m), −126.16~126.77 (2F, m)

MS: 370 (M$^+$+1)

Chlorine gas (118 g, 1.66 mol) and water (40 g, 2.22 mol) were fed into the mixture of $C_4F_7CH_2CF_2CH_2CH_2SCN$ (205 g, 0.56 mol) and acetic acid (109 g, 1.82 mol) over 10 hours at 45~50° C. in an autoclave. The product from the reactor was heated in a flask with a stir bar at 70° C. and hot water (70° C.) was added. The organic layer was separated, followed by adding of toluene (216.25 g). The product in toluene was washed with 3.5% solution of brine at 70° C. twice. After the second wash, a Dean-Stark strap was set up to strip off water. The final product was 70% of $C_4F_7CH_2CF_2CH_2CH_2SO_2Cl$ (228 g, 39%) by weight in toluene. $C_4F_7CH_2CF_2CH_2CH_2SO_2Cl$ (7 g, 0.0171 mol, 70.3% in toluene) was added dropwise to methanol (10 g, 0.313 mol) at 70° C. After the reaction mixture was reflux overnight, methanol and toluene were distilled off. The final product $C_4F_7CH_2CF_2CH_2CH_2SO_3H$ (5.2 g, 77.7%) was diluted with 70° C. deionized water until it was 30% active.

$^1$H NMR (D$_2$O, 400 MHz) δ 3.22~2.99 (2H, m), 2.59~2.42 (2H, m)

$^{19}$F NMR (D$_2$O, 377 MHz) δ −81.52~81.53 (2F, m), −95.24~95.54 (2F, m), −12.88~113.30 (2F, m), −124.93~125.11 (3F, m), −126.16~126.31 (2F, m)

Test Methods

Test Method 1—Surface Tension Measurement

Surface tension was measured using a Kruess Tensiometer, K11 Version 2.501 in accordance with instructions with the equipment. The Wilhelmy Plate method was used. A vertical plate of known perimeter was attached to a balance, and the force due to wetting was measured. Ten replicates were tested of each dilution, and the following machine settings were used: Method: Plate Method SFT; Interval: 1.0 s; Wetted length: 40.2 mm; Reading limit: 10; Min Standard Deviation: 2 dynes/cm; Gr. Acc.: 9.80665 m/s^2.

EXAMPLES

Example 1

1 L stainless reactor was charged with distilled water (450 mL), $C_4F_9CH_2CF_2CH_2CH_2SO_3Na$ (3.0 g), disodium hydrogen phosphate (0.4 g) and ammonium persulfate (0.4 g), followed by introducing tetrafluoroethylene (TFE) (40 g) and hexafluoropropylene (HFP) (140 g). The reactor heated at 70° C. for eight hours under agitation. The polymer emulsion unloaded from the reactor was coagulated with saturated MgSO$_4$ aqueous solution. The polymer precipitate was collected by filtration and washed with warm water (70° C.) several times. After drying in vacuum oven (100 mmHg, 13300 Pa) at 100° C. for 24 hours, 34 g of white polymer was obtained. Tm: 249.08° C.; Composition $^{19}$F NMR (mol %): HFP/TFE (12.8/87.2)

Example 2

A solution of 29.6 g of C$_4$F$_9$CH$_2$CF$_2$CH$_2$CH$_2$SO$_3$Na, 18.5 g disodium phosphate heptahydrate and 24,900 g of deionized, deoxygenated water was charged to a 40 liter reactor. The solution was heated to 80° C. After removal of trace oxygen, the reactor was pressurized with 2441 grams of a mixture of 4.2% by weight vinylidene fluoride (VF2), 85.8% by weight hexafluoropropene (HFP), and 10.0% by weight tetrafluoroethylene (TFE). At the end of pressurization, the reactor pressure was 2.0 MPa. The reactor was charged with 50.0 ml of an initiator solution of 1% ammonium persulfate and 5% disodium phosphate heptahydrate to start polymerization. As the reactor pressure dropped, a mixture of 35.0% by weight vinylidene fluoride, 37.0% by weight hexafluoropropene, and 28.0% by weight tetrafluoroethylene was fed to the reactor to maintain a 2.0 MPa pressure. After 45 g of this monomer mixture had been fed, 26.0 g of a mixture of 37.29 mol % 1,4-diiodoperfluorobutane, 46.38 mol % 1,6-diiodoperfluorohexane, 11.98 mol % 1,8-diiodoperfluorooctane, and 3.76 mol % 1,10-diiodoperfluorodecane was charged to the reactor. Additional initiator solution was added to maintain polymerization rate. After 3700 g of the monomer mixture had been fed, 4-iodo-3,3,4,4-tetrafluorobutene-1 (ITFB) was introduced to the reactor at a feed rate of 5.0 g ITFB per 1000 g monomer. After a total of 8333 g incremental major monomer had been fed, corresponding to a total of 127 ml initiator solution, 20.4 g ITFB and 15.5 hours, monomer and initiator fed was discontinued. The reactor was cooled and the pressure in the reactor reduced to atmospheric. The resulting fluoroelastomer latex had a solids content of 24.7 wt. % solids, a pH of 4.0, and an average particle diameter of 312 nm, measured by BI-9000 Particle Sizing, Brookhaven Instruments Corporation. The latex was coagulated with aluminum sulfate solution, washed with deionized water, and dried. The fluoroelastomer had an inherent viscosity of 0.43 dl/g, a Mooney viscosity, ML (1+10), of 64 and contained 34.3% by weight VF2, 36.9% by weight HFP, 28.5% by weight TFE and 0.22% by weight I.

Example 3

The Compound 2 which was made by the procedure described above was used in the surface tension measurement according to the Test Method 1. The results are shown in Table 1.

Comparative Example A

The procedure of the Example 3 above was employed, but using as the fluorochemical a perfluoroalkylethyl alcohol of the formula F(CF$_2$)$_6$CH$_2$CH$_2$OH. The product was added to water and tested for surface tension using Test Method 1. The results are shown in Table 1.

TABLE 1

| | Surface Tension Measurement | | | | | | | |
|---|---|---|---|---|---|---|---|---|
| Example* | 0.001% | 0.005% | 0.010% | 0.050% | 0.100% | 0.200% | 0.500% | 1.00% |
| Example 3 | 72.9 | 71.2 | 69.2 | 49.8 | 42.0 | 32.6 | 21.7 | 17.4 |
| Comparative Example A | 72.5 | 68.4 | 64.4 | 50.6 | 32.1 | 27.4 | 22.1 | 22.8 |

*Example was added to deionized water by weight based on solids of the additive in DI water; Standard Deviation <1 dynes/cm; Temperature 23° C. Normal surface tension of deionized water is 72 dyne/cm.

The data in Table 1 shows that when the above fluorosulfonic acid surfactant was added at a specified rate, the surface tension of each aqueous solution was reduced significantly. Example 3 showed comparative surface tension reduction to the Comparative Example A. The surfactant of Example 3 performed as well as Comparative Example A despite having less fluorine present, so was more fluorine efficient.

Example 4

A 1 L stainless reactor was charged with distilled water (450 mL), C$_4$F$_9$CH$_2$CF$_2$CH$_2$CH$_2$SO$_3$Na (4.0 g), disodium hydrogen phosphate (0.4 g) and ammonium persulfate (0.4 g), followed by introducing tetrafluoroethylene (TFE) (46 g) and perfluoro-(methyl vinyl ether) (PMVE) (39 g). The reactor was heated at 70° C. for eight hours under agitation. The polymer emulsion was unloaded from the reactor and was coagulated with saturated MgSO$_4$ aqueous solution. The polymer precipitate was collected by filtration and washed warm water (70° C.) several times. After drying in vacuum oven (13300 Pa) at 100° C. for 24 hours, 56 g of white polymer was obtained. Tg: −7.3° C.; Composition $^{19}$F NMR (mol %): PMVE/TFE (25.3/74.7).

What is claimed is:

1. A method of altering the surface behavior of a liquid, comprising adding to the liquid, which is an acidic, oxidizing or reducing medium, a compound of formula (1):

$$R_f(CH_2CF_2)_m—(CH_2)_nSO_3M \qquad (1)$$

wherein
Rf is a C$_1$ to C$_4$ linear or branched perfluoroalkyl group,
m is 1,
n is from 0 to 4, and
M is H, NH$_4$, Li, Na or K.

2. The method of claim 1 wherein the liquid is a coating composition, battery composition, fire-fighting agent, floor finish, ink, foaming agent, release agent, repellency agent, flow modifier, film evaporation inhibitor, wetting agent, penetrating agent, cleaner, grinding agent, electroplating agent, corrosion inhibitor, etchant solution, soldering agent, microbial agent, pulping aid, rinsing aid, polishing agent, personal care composition, drying agent, antistatic agent, or bonding agent.

3. The method of claim 1 wherein the liquid is a chrome plating bath.

4. The method of claim 1 wherein the liquid is used in a valve regulated lead acid battery.

5. The method of claim 1 wherein the surface behavior is selected from the group consisting of wetting, antistatic, antifoaming, penetration, spreading, leveling, flowing, repelling, releasing, lubricating, etching, and bonding.

\* \* \* \* \*